Nov. 26, 1968    L. ELSBETT    3,412,552
INTERNAL COOLING FOR A 4-CYCLE INTERNAL
COMBUSTION ENGINE CYLINDER
Filed Sept. 21, 1966
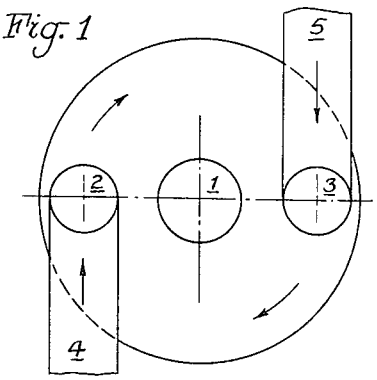
Fig. 1
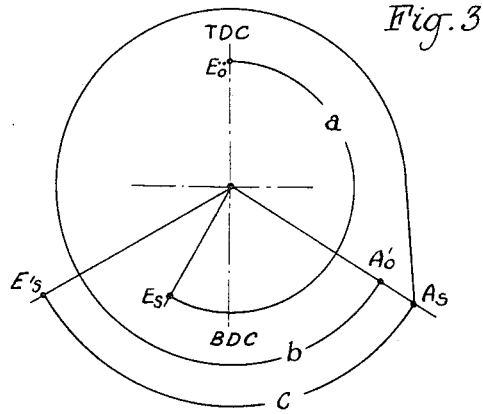
Fig. 3
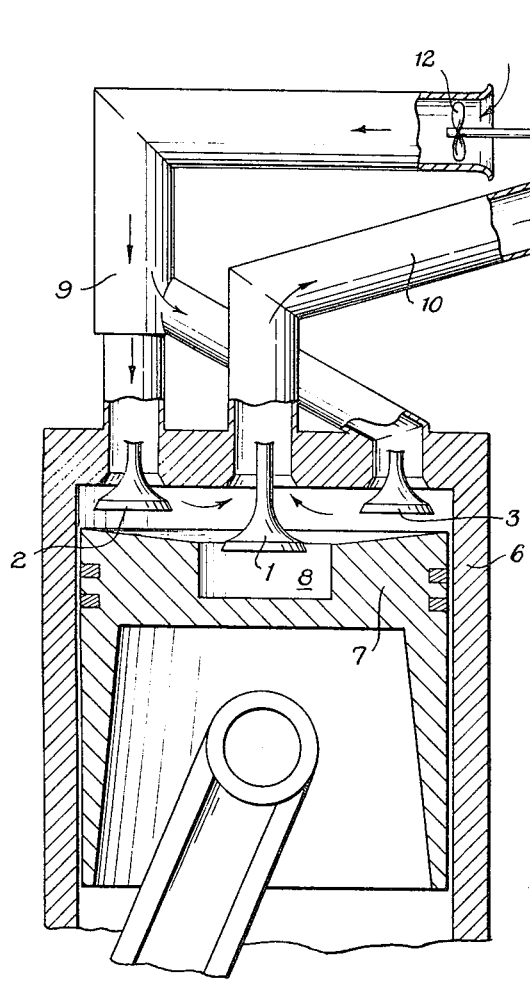
Fig. 2
Fig. 4
INVENTOR
Ludwig Elsbett
BY Bailey, Stephens and Huettig
ATTORNEYS

United States Patent Office

3,412,552
Patented Nov. 26, 1968

3,412,552
INTERNAL COOLING FOR A 4-CYCLE INTERNAL COMBUSTION ENGINE CYLINDER
Ludwig Elsbett, Hilpoltstein, Germany, assignor to Elsbett-Konstruktion, Hilpoltstein, Germany
Filed Sept. 21, 1966, Ser. No. 581,023
Claims priority, application Germany, Sept. 24, 1965, E 30,155
6 Claims. (Cl. 60—13)

ABSTRACT OF THE DISCLOSURE

In a 4-cycle internal combustion engine, especially a diesel engine in which the intake air forms an air swirl in the cylinder, the exhaust valve is kept open beyond the conventional closing time and overlaps the open intake valve. This pulls a column of cooling intake air through the cylinder. A protective layer of unburned intake air is formed along the cylinder wall.

---

This invention relates to the internal cooling of the interior of a cylinder for a 4-cycle internal combustion engine and in particular relates to the use of the intake air for cooling the cylinder.

As contrasted to a 2-cycle engine in which the cylinder is cooled exclusively by means of the scavenging air, the conventional 4-cycle engine has the disadvantage in that the intake and exhaust valves are open at different times so that it is not possible to draw the intake air through the cylinder for the purpose of internal cooling of the cylinder. Even the overlapping of the openings of the intake and exhaust valves is not possible because the piston will strike the valve.

The object of this invention is to produce a method and structure by which the openings of the intake and exhaust valves can overlap for the purpose of internally cooling the cylinder. In this invention, the piston head has the combustion chamber above which the exhaust valve is mounted usually centrally of the cylinder and into which chamber the exhaust valve extends during the scavenging of the cylinder and thus the exhaust valve can remain open shortly before or shortly after the intake valve is closed.

The fresh intake air is therefore drawn through the cylinder into the exhaust gas duct as long as the column of exhausted gas is effective in maintaining a suction. The flow of the scavenging air in the cylinder is enhanced by the flow of the column of intake air as accelerated by the piston intake stroke and the energy of the leaving of the exhaust gas from the cylinder.

A further feature of this invention is that an exhaust gas driven turbo-supercharger is used to increase the flow of intake air for cooling and scavenging the cylinder. The compression pressure of the intake air in the cylinder is no longer increased as heretofore customary by the closing of the exhaust valve, but rather depends on the pressure in the exhaust duct. Despite a high supercharger capacity, the loading pressure is held to a minimum. With the exhaust valve closed, it is even possible that the compression of the intake air in the cylinder can be held less than is the case with engines in which the exhaust valve is closed after the intake valve.

In this invention, the heating and cooling by means of the air in the cylinder is balanced so that the effective internal cooling is the same during scavenging of the exhaust gas as during the burning of the fuel in the combustion stroke. Depending upon demand and the predetermined external cooling, it is possible to manipulate the closing point of the exhaust valve before or after the closing point of the intake valve to achieve either a large capacity with little internal cooling or a small capacity with extensive internal cooling.

The velocity of the air swirl in the cylinder is increased for stabilizing the internal heating and cooling. The central mounted open exhaust valve forms a sink during scavenging which effectively increases the swirl of the intake air. This, on one hand, improves the transition of heat from the cylinder wall to the cool intake air during the cooling period, and on the other hand, it is possible by reason of the strong air swirl to burn the fuel in the cylinder during the combustion stroke from the center of the cylinder toward the cylinder wall only so far that a cool, protective layer of unburned intake air still remains along the cylinder wall and prevents the wall from being heated by convection. The portion of unburned air amounts to at least 20% even in a good diesel engine and increases by internal cooling by the added amount which is burned less because less heat loss occurs. This reduced loss of heat enhances further the stabilization of heating and internal cooling and improves upon the fuel consumption.

A further effective gain of this invention is that the energy available for driving the exhaust gas supercharger increases by that portion of the air used to drive the turbine instead of being retained in the cylinder. Also added to this is the heat from the cylinder which is moved to the turbine. This makes it profitable to reduce the turbine capacity which heretofore forced unnecessary amounts of intake air into the cylinder. Even a filling of one in a cylinder is sufficient for the 10 to 12 pme. which heretofore was practiced only with a cylinder filling of 1.6 in a loaded engine.

A further important feature of this invention is that during engine starting the volume of air can be held to zero and that during idling and low loads less than the present pumping volume is placed in the cylinder. The piston, when no exhaust energy is available, draws in the intake air and the exhaust gas when the exhaust valve is open. In this condition of operation, the cylinder draws back half of its warm exhaust gases and thus remains warm and starts well. Even with a small engine load, it is possible to eliminate the blue smoke of unburned hydrocarbons and the poisonous carbon monoxide gases because the air swirl in the cylinder breaks down this condition and no fuel is carried to the cylinder wall where it would only burn slowly and incompletely.

Another feature of the invention is in that the cylinder wall coated with a film of fuel is cooled during the combustion stroke to the temperature existing before the combustion stroke and thus enabling substantially the elimination of a water-cooled jacket for the cylinder or the use of cooling fins.

The means by which the objects of the invention are obtained are described more fully with reference to the accompanying schematic drawings in which:

FIGURE 1 is a diagram showing the arrangement of the valves;

FIGURE 2 is a cross-sectional view through an engine cylinder according to this invention;

FIGURE 3 is a graph of the valve timing; and

FIGURE 4 is a cross-sectional view showing the combustion gases surrounded by a layer of cooling air.

As shown in FIGURE 1, the exhaust valve 1 is mounted on the longitudinal axis of the cylinder. Two intake valves 2 and 3 with tangential intake ducts 4 and 5, respectively, produce an air swirl in the cylinder which is increased by the central sink of the exhaust valve.

In FIGURE 2, the cylinder 6 contains a piston 7 having a combustion chamber 8 and into which chamber the exhaust valve 1 extends at the upper dead center of the scavening stroke. The intake air flows through intake air duct 9 through the cylinder and out through the exhaust duct 10 which contains a turbine 11 for driving a blower 12 mounted in the intake duct 9.

FIGURE 3 is a graph for the valve timing, curve $a$ being for the intake valve and curve $b$ for the exhaust valve. The angle $c$ is the range for the exhaust valve closure time. The exhaust valve thus remains open at least for a major portion of the intake time and beyond the end of the intake time. The intake valve opens at $Eö$ which is at TDC, top dead center, and closes at $Es$ on curve $a$. The exhaust valve conventionally opens at $Aö$ and closes at $As$ before BDC, bottom dead center, on curve $b$. In this invention, the exhaust valve is kept open an additional time between $As$ and $E's$ as on curve $c$. Thus the exhaust valve is open the time of curve $b$ plus curve $c$.

In FIGURE 4, the mixture of fuel and air 13 is shown burning during the combustion stroke while being surrounded by a layer of unburned cooling air 14.

Having now described the means by which the objects of the invention are obtained.

I claim:

1. A method of internally cooling the interior of a four-cycle internal combustion engine, such as a diesel engine and having a cylinder, a piston in said cylinder, a combustion chamber in the head of said piston, an exhaust valve which when open extends into said chamber, and at least one air intake valve offset from said exhaust valve, comprising forming an intake air swirl in said cylinder around said chamber, opening said exhaust valve to overlap at least the major part of the time and beyond the time the intake valve is open for drawing intake air through said cylinder and said exhaust valve to clean and cool said cylinder.

2. A method as in claim 1, further comprising maintaining said air swirl as cool air adjacent the cylinder wall during the burning of the fuel in said cylinder with a maximum of 80% of the intake air being mixed with said fuel.

3. A method as in claim 2, said engine having an exhaust gas operated turbo-supercharger, and further comprosing closing the exhaust valve at about the same time the intake valve is closed for keeping the compression of the air remaining in the cylinder at the same or lower value of the air used to clean and cool the cylinder.

4. A method as in claim 3, further comprising cooling the oil coated wall of said cylinder with said air to the temperature existing before the fuel combustion stroke of said piston.

5. A method as in claim 3, further comprising closing said exhaust valve to throttle the flow of air through the cylinder at a time when sufficient warm air remains in said cylinder to promote quick engine starting and to avoid the exhaust of blue smoke and CO gas.

6. A method as in claim 3, further comprising using the heat energy derived from the cooling of the cylinder for operating said turbo-supercharger.

References Cited

UNITED STATES PATENTS

| | | | |
|---|---|---|---|
| 2,900,971 | 8/1959 | Kauffmann | 60—13 |
| 2,958,316 | 11/1960 | Buchi | 123—79 |
| 3,003,483 | 10/1961 | Buchi | 123—79 |

MARTIN P. SCHWADRON, *Primary Examiner.*

DOUGLAS HART, *Assistant Examiner.*